B. R. FARRAND.
SNAP HOOK.
APPLICATION FILED APR. 1, 1915.
1,180,387.
Patented Apr. 25, 1916.
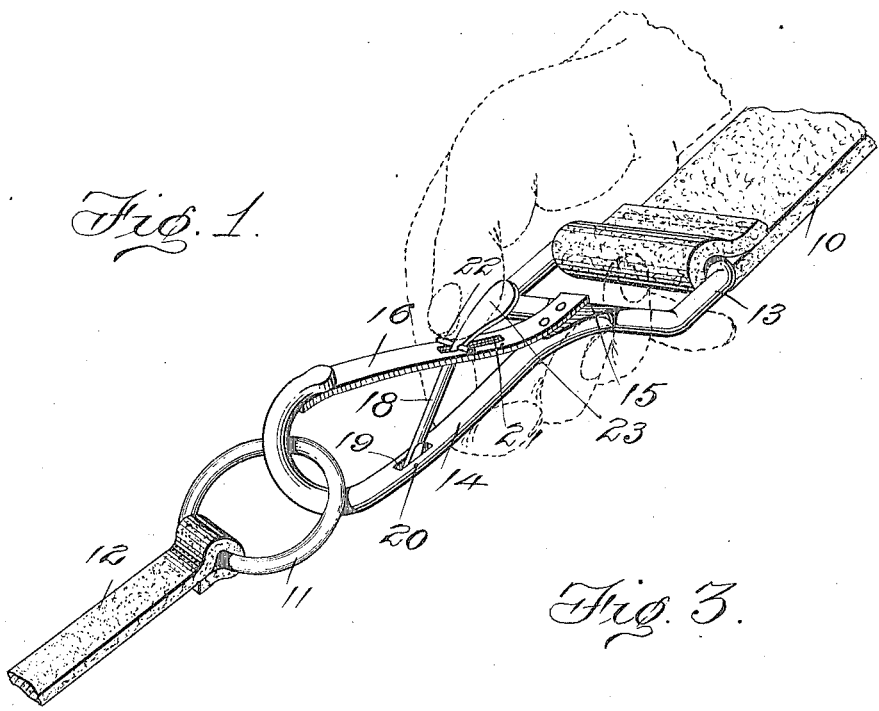
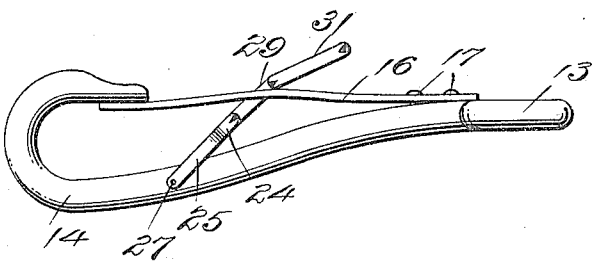
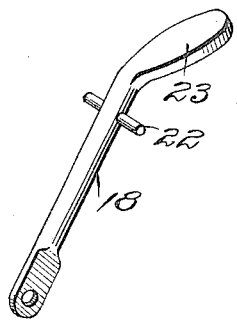
Witnesses
Inventor
Burdette R. Farrand,
By Richard B. Owen,
Attorney

UNITED STATES PATENT OFFICE.

BURDETTE R. FARRAND, OF WASHINGTON, CONNECTICUT.

SNAP-HOOK.

1,180,387.     Specification of Letters Patent.     Patented Apr. 25, 1916.

Application filed April 1, 1915. Serial No. 18,556.

*To all whom it may concern:*

Be it known that I, BURDETTE R. FARRAND, a citizen of the United States, residing at Washington, in the county of Litchfield and State of Connecticut, have invented certain new and useful Improvements in Snap-Hooks, of which the following is a specification.

My invention relates to snap hooks, and the object thereof is to provide a positive actuating means that can be employed in conjunction with a snap hook of any ordinary type now in use, for effecting the opening of the hook so that it can be removed or replaced into position when desired.

The present invention further aims to provide a lever means, that is preferably used in connection with a snap hook of that type wherein a spring tongue is employed and which has one end rigid on the hook while its other free end forms the movable closure; for effecting a positive operation of the spring from a point where the operator's hand will not interfere with the removal or replacement of the hook.

Other objects and advantages resulting from the use of my invention will be apparent as the following description continues.

With the above and other objects in view my invention relates to such details of construction and in the arrangement and combination of parts as will be hereinafter set forth.

In the accompanying drawings wherein is illustrated my invention like numerals designate like parts throughout the several views and Figure 1 is a perspective view of an ordinary snap hook, as in operation, showing my invention in place thereon. Fig. 2 is a perspective view of the operating lever as shown in Fig. 1. Fig. 3 is a side elevation of a snap hook showing a modified form of my invention in place thereon. Fig. 4 is a perspective view of the operating lever of that type shown in Fig. 3.

In the accompanying drawings wherein is illustrated my invention, the latter has been shown in connection with a snap hook of substantially the usual type, which is illustrated in connection with a supporting strap 10 and engaged with a ring 11 carried on the connection 12. This specific arrangement is shown only to illustrate the usual position of a snap hook of that type shown, and it is to be understood that the various details do not in any way limit the scope of my invention.

The snap hook generally consists of a body portion 13 which is usually constructed in the manner illustrated in order to accommodate the free end of the strap 10 whereby an efficient connection therebetween may be attained. Extending from the body portion 13 in the manner illustrated is the hook portion 14, the outer terminal of which is bent to assume a substantially semi-circular position as shown in Figs. 1 and 3 of the drawing. The hook portion 14, at its point of connection with the body 13, is flattened as shown at 15 to form a seat, for receiving one end of the closure spring 16, a rigid connection being obtained through the medium of the securing pins 17 as illustrated. The opposite end of the closure spring is normally held, through action of its own tension, in engagement with the under face of the hook portion 14, adjacent the terminal of its bent end, in order to normally prevent the removal of a structure such as illustrated at 11, and yet allowing the ready insertion thereof when it is desired.

In further applying my invention to a hook of the above type, a lever 18 is provided, which has one end pivoted within the cut-out portion 19 of the hook as shown at 20, while its intermediate portion operates through an elongated slot 21 in the spring closure. For obtaining a positive actuation of the spring closure through the manipulation of the lever 18, the latter is provided with a transverse engaging pin 22 which normally engages the upper face of the spring closure as is clearly shown in Fig. 1. The upper portion of the lever beyond the engaging pin 22 is flattened as shown at 23 in order to provide a suitable finger engaging seat for the hand of the operator, its specific curvature allowing the same to lie flush upon the adjacent end of the spring closure when the latter is in a depressed position. Thus it will be apparent that the hand of the operator, will be entirely out of the way after the depression of the spring closure has been attained so that the ring or other engaging structure can be quickly and easily removed therefrom. Attention is further called to the fact that the lower pivot point of the lever is preferably positioned adjacent a point on the hook which is opposite to the terminal of the curved portion thereof, while the upper portion of the lever operates through the slot 21 which is preferably positioned adjacent the rigid end of the spring closure, consequently allowing a greater leverage to be obtained for causing the depression of the spring closure by only a minimum amount of exertion.

In Figs. 3 and 4 of the drawings I have shown in connection with a snap hook of that type illustrated in Fig. 1 a modified form of operating lever. This lever consists primarily of the provision of a stem portion 24, the lower terminal of which is split to form a pair of parallel spaced apart extensions 25, each of which is provided with an aperture 26 to receive a transverse pivot member 27 as shown in Fig. 3 in order to hold the stem portion and remaining structure in pivotal relation with the hook. The upper terminal of the stem portion is bent to form an engaging arm 28 which extends therefrom at a right angle as shown, the latter being in turn formed into a vertical portion 29 which extends in a plane similar to the stem 24. The portion 29 is further bent to provide an engaging arm 30, the latter extending parallel with the arm 28 for the purpose which will presently appear. The stem portion being normally held pivoted in relation to the hook by means of the extensions 25 allows the spring closure to be inserted between the engaging arms 28 and 30 respectively, the latter arm normally resting thereon as shown in Fig. 3, and which is adapted to cause the depression of the same when the lever is properly manipulated. A finger seat 31 is provided of that type shown in connection with the preferred form of my invention, in Figs. 1 and 2, the same being curved in a similar manner to lie flush upon the spring closure when the same is in a depressed condition.

The operation of the modified lever is thought to be readily apparent upon reference to Fig. 3 of the drawings. This type of lever is very simple in construction and can be manufactured at a minimum cost.

Other advantages resultant from the use of my invention will be apparent to those who are conversant with the crude and unsatisfactory devices which are now in use in connection with this art.

Having thus fully described my invention, what I claim as new and desire to secure by Letters Patent is:

1. In a device of the character described, a hook including a spring closure, a lever pivotally connected to said hook and means carried by and extending at a substantially right angle from said lever and slidably engaging said closure for effecting the opening of the latter during the manipulation of the lever.

2. In a device of the character described, a hook including a spring closure, a lever pivoted upon said hook and means carried by said lever and slidably engaging said closure for effecting the opening of the latter during the manipulation of said lever.

3. In a device of the character described, a hook including a spring closure, a lever pivoted on said hook, and means carried by said lever and slidably engaging said closure for depressing the same during the manipulation of said lever, said lever being operable in a plane similar to the longitudinal axis of said hook, substantially as described.

4. In a device of the character described, a hook, a spring, one end of said spring being rigid on said hook, the other end of said spring normally engaging said hook for forming a closure, a lever pivoted on said hook, means carried by said lever and slidably engaging said spring for causing the depression of the free end thereof during the manipulation of said lever, a finger seat formed from the upper portion of said lever, said finger seat being curved to lie flush with the adjacent portion of the rigid end of said spring when the opposite end of the latter is in a depressed position, substantially as described.

5. In a snap hook, a body portion curved at one end, a leaf spring fixed to said body portion and having one end in engagement with said curved portion, said leaf spring being provided with a longitudinally extending slot, a lever pivotally connected to said body portion, said lever extending through said slot, and means carried by said lever and engaging the upper face of said leaf spring to cause the depression of said leaf spring upon the manipulation of said lever.

6. In a snap hook, a body portion, means for the attachment of a strap to said body portion at one end, said body portion being curved at its other end, a leaf spring having one end fixed to said body portion and the other end normally in engagement with said curved portion, said leaf spring being provided with a longitudinal slot adjacent its point of connection with said body portion, a lever having one end pivotally connected to said body portion adjacent said curved portion and extending through said slot, means carried by said lever and slidable upon the upper face of said leaf spring to actuate said leaf spring upon manipulation of said lever.

In testimony whereof I affix my signature in presence of two witnesses.

BURDETTE R. FARRAND.

Witnesses:
E. V. RANDALL,
ROBERT E. CARTER.

Copies of this patent may be obtained for five cents each, by addressing the "Commissioner of Patents, Washington, D. C."